(12) United States Patent
Beauvais et al.

(10) Patent No.: US 10,246,090 B2
(45) Date of Patent: Apr. 2, 2019

(54) VEHICLE COLLISION SEVERITY MITIGATION

(71) Applicant: Ford Global Technologies, LLC, Dearborn, MI (US)

(72) Inventors: Brandon Beauvais, Dearborn, MI (US); Scott J. Lauffer, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 194 days.

(21) Appl. No.: 15/344,703

(22) Filed: Nov. 7, 2016

(65) Prior Publication Data

US 2018/0126983 A1    May 10, 2018

(51) Int. Cl.
*G08G 1/16*    (2006.01)
*B60W 30/095*    (2012.01)
(Continued)

(52) U.S. Cl.
CPC ........ *B60W 30/0953* (2013.01); *B60W 10/04* (2013.01); *B60W 10/18* (2013.01); *B60W 10/20* (2013.01); *B60W 30/085* (2013.01); *B60W 30/0956* (2013.01); *B60W 2520/10* (2013.01); *B60W 2550/302* (2013.01); *B60W 2550/306* (2013.01); *B60W 2710/0666* (2013.01); *B60W 2710/083* (2013.01); *B60W 2710/18* (2013.01); *B60W 2710/20* (2013.01)

(58) Field of Classification Search
CPC ............. G01S 19/42; G01S 2013/9321; G01S 2013/9342; G01S 2013/9346; G01S 2013/935; G01S 2013/9353; B60W 2550/402; B60W 30/18154; G01C 21/34; G08G 1/163; G08G 1/166; G08G 1/167

USPC ....................... 701/41, 472, 517; 342/357.25
See application file for complete search history.

(56) References Cited

U.S. PATENT DOCUMENTS

| 6,026,347 | A | 2/2000 | Schuster |
| 8,301,336 | B2 | 10/2012 | Baumann et al. |

(Continued)

FOREIGN PATENT DOCUMENTS

| CN | 102463951 A | 4/2014 |
| DE | 102005062275 S1 | 6/2007 |

(Continued)

OTHER PUBLICATIONS

Search Report from the United Kingdom Intellectual Property Office dated Apr. 19, 2018 regarding Application No. GB1718153.8 (3 pages).

*Primary Examiner* — Dalena Tran
(74) *Attorney, Agent, or Firm* — Frank A. MacKenzie; Bejin Bieneman PLC (57) ABSTRACT

Vehicles can be equipped with a computing device to determine two or more paths of available paths for the vehicle that each include a predicted impact with an object. The computing device can determine a time to impact, vehicle speed and direction and object speed and direction, and an object type. The computing device can also determine a best path of the two or more vehicle paths by determining damage severity based on time to impact, vehicle speed and direction and object speed and direction and control one or more of steering, propulsive torque and braking torque to pilot the vehicle on the best path based on the damage severity.

20 Claims, 5 Drawing Sheets

(51) Int. Cl.
*B60W 10/04* (2006.01)
*B60W 10/18* (2012.01)
*B60W 10/20* (2006.01)
*B60W 30/085* (2012.01)

(56) References Cited

U.S. PATENT DOCUMENTS

| | | | |
|---|---|---|---|
| 8,504,283 B2 * | 8/2013 | Aso | G01S 13/726 |
| | | | 280/735 |
| 8,626,432 B2 | 1/2014 | Nishiyama et al. | |
| 8,676,443 B2 | 3/2014 | Han et al. | |
| 9,623,851 B1 * | 4/2017 | Cymbal | B60T 8/1766 |
| 9,944,283 B2 * | 4/2018 | Kindo | B62D 15/0265 |
| 9,963,127 B2 * | 5/2018 | Pilutti | B60T 7/22 |
| 2013/0060400 A1 | 3/2013 | Hahne | |
| 2016/0200318 A1 | 7/2016 | Parikh et al. | |
| 2017/0137023 A1 * | 5/2017 | Anderson | B60G 17/0195 |

FOREIGN PATENT DOCUMENTS

| | | |
|---|---|---|
| DE | 102008040038 A1 | 6/2009 |
| DE | 102009020649 A1 | 11/2010 |
| WO | WO 2004080771 A1 | 9/2004 |

* cited by examiner

VEHICLE COLLISION SEVERITY MITIGATION

BACKGROUND

Vehicles can be equipped to operate in both autonomous and occupant piloted mode. Vehicles can be equipped with computing devices, networks, sensors and controllers to determine a path upon which to pilot an autonomous vehicle and upon which to assist an occupant in piloting a vehicle.

DETAILED DESCRIPTION

Vehicles can be equipped to operate in both autonomous and occupant piloted mode. By a semi- or fully-autonomous mode, we mean a mode of operation wherein a vehicle can be fully or partially piloted by a computing device as part of a vehicle control system having sensors and controllers. The vehicle can be occupied or unoccupied, but in either case the vehicle can be at least partly piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting, we mean directing the movements of a vehicle so as to move the vehicle to a destination.

Figure 1:
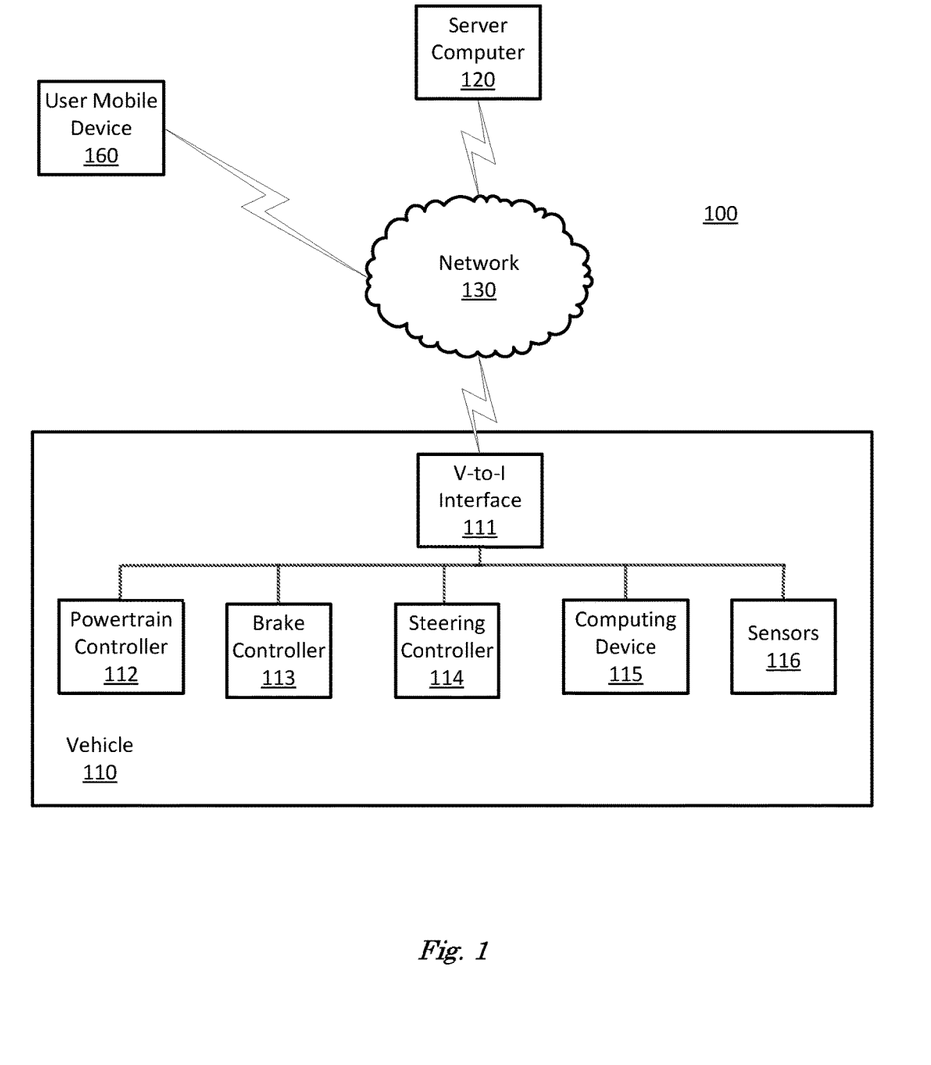
FIG. 1 is a block diagram of an example vehicle control system.

FIG. 1 is a diagram of a vehicle control system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH®, and wired and/or wireless packet networks. The computing device 115 also includes nonvolatile memory such as are known. Computing device can log information by storing the information in nonvolatile memory for later retrieval and transmittal via the vehicle communication network and V-to-I interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications network, e.g., bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
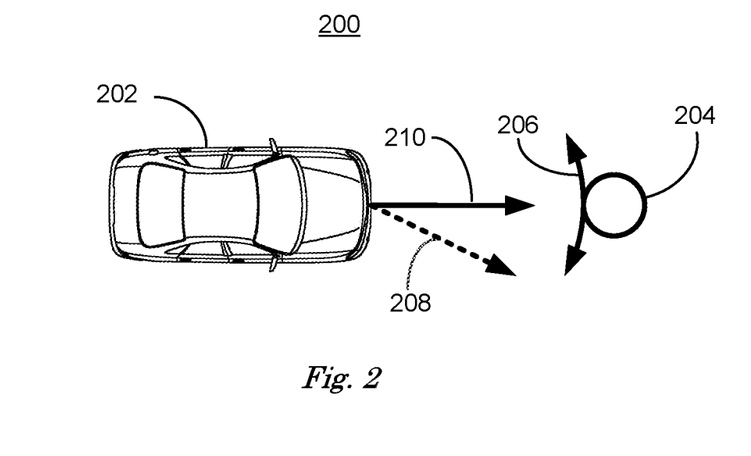
FIG. 2 is a diagram of an example vehicle and an example object.

FIG. 2 is a diagram of a traffic scene 200 including a vehicle 202 and a traffic object 204. Vehicle 202 can include a vehicle control system 100 including a computing device 115 as described above. Traffic object 204 can be a three-dimensional shape having form and mass, impact with which can cause damage to vehicle 202. Possible items that could be included in traffic object 204 include one or more parked vehicles, barriers, abutments, pilings, railings and poles, for example.

Vehicle 202 is moving at a speed and at a direction, demonstrated by speed vector 210. Speed vector 210 has direction and length equal and proportional respectively to the direction and speed of vehicle 202. At the time traffic scene 200 occurs, computing device 115 can determined that if vehicle 202 continues to travel the path represented by speed vector 210, vehicle 202 will impact traffic object 204 at a determined time to impact.

Computing device 115 can also determine, by having information regarding the operating characteristics of vehicle 202, what range of directions 206 vehicle can possibly achieve given the determined time to impact and vehicle 202 speed. Range of directions 206 include all of the paths that vehicle 202 can possibly travel given the steering capabilities of vehicle 202 and the speed vector 210 of vehicle 202. Computing device 115 can represent the large number of possible paths by selecting a finite number (<~10) of paths that are substantially evenly distributed over the range of directions 206, forming a subset of all of paths that vehicle 202 can possibly travel.

Range of directions 206 include all of the paths vehicle 202 can travel based on the steering capabilities of the vehicle 202 in terms of rate of direction change and rate of change in propulsive torque per unit time, for example. It can be the case that steering controller 114 can turn vehicle 202 fast enough to produce enough centripetal force to cause the vehicle 202 to lose traction and skid. Paths that cause vehicle 202 to lose traction and skid are not included in the range of directions 206.

A path requiring change of direction represented by dotted speed vector 208 can be required for vehicle 202 to safely avoid traffic object 204, for example. It can be the case that a path including a change of direction represented by dotted speed vector 208 can be not included in the range of directions 206 achievable by vehicle 202 and therefore be unachievable by vehicle 202. In this case an impact between vehicle 202 and traffic object 204 can be inevitable, since vehicle 202 cannot travel a path that will avoid object 204. Traffic scene 200, where vehicle 202 is traveling at a speed and direction such that an impact with traffic object 204 is inevitable, can occur when, for example, traffic object 204 is a vehicle that suddenly stopped in traffic.

In the case when an impact between a vehicle 202 and traffic object 204 is inevitable, computing device 115 can determine the damage severity associated with each of the finite number of paths in the selected subset of paths that result in impact between vehicle 202 and traffic object 204. Damage severity can be defined in terms of dollar value of predicted damage to the vehicle 202 and dollar values associated with predicted injury to occupants of vehicle 202. Any predicted results of an impact between vehicle 202 and traffic object 204 that can be assigned a dollar value can be included in damage severity. Damage severity can also include dollar values associated with predicted damage to the traffic object 204 and dollar values associated with predicted injury to occupants included in traffic object 204.

Computing device 115 can determine damage severity associated with one or more paths that result in impact with traffic object 204 and determine a path associated with the minimum damage severity. Each path included in the selected subset of possible paths included in the range of directions 206 that vehicle 202 can travel results in an impact between vehicle 202 and traffic object 204. Each of these possible impacts will result in contact between particular portions of vehicle 202 and particular portions of traffic object 204 depending upon which path is traveled. Computing device 115 can estimate the location, direction and force of the impact with respect to portions of vehicle 202 for each path in the selected subset of possible paths included in the range of directions 206.

For each path in the selected subset of paths, computing device 115 can determine the kinetic energy and direction of the vehicle 202 at the time of impact based on the location, mass and speed and combine the kinetic energy and direction with information regarding the structural performance of the portions of vehicle 202 being impacted to determine the damage severity associated with each path of the selected subset of paths. Computing device 115 can compare the damage severity associated with each of the paths included in the selected subset of paths and select the path having the minimum damage severity.

Information regarding the structural performance of the portions of vehicle 202 being impacted can be predetermined experimentally, e.g. crash testing vehicles and measuring the results and by simulating impacts using computer modeling to simulate a large number of impacts at varying speeds and directions to various locations on the vehicle. Information regarding the structural performance of each portion of vehicle 202 predetermined in this fashion can be downloaded and stored by computing device 115 in non-volatile memory. Structural performance can include an estimate of the cost to repair or replace portions of vehicle 202 based upon the kinetic energy and direction and location of impact.

Computing device 115 can also include predetermined information related to the determined type of traffic object 204 in non-volatile memory. Damage severity to vehicle 202 resulting from an impact with a traffic object 204 can be a function of the material, mass, structure and shape of the traffic object 204. For example, the forces of impact on portions of vehicle 202 will depend upon whether traffic object 204 is a road sign on a pole designed to break away in the event of impact or a parked vehicle, for example. Computing device 115 can use information from sensors 116 to determine the type of traffic object 204 that will be impacted and recall information related to the determined type of traffic object 204 to combine with information related to structural performance of portions of vehicle 202 when determining damage severity.

Computing device 115 can determine a best path of the paths included in the range of directions 206 based on minimizing the damage severity resulting from the impending impact between vehicle 202 and traffic object 204. The best path is defined as the path that results in minimum estimated damage severity based on predicted kinetic energy, direction and location of vehicle 202 at the time of impact and predetermined structural performance of portions of the vehicle 202 as result of the impact including estimating traffic object 204 type and location. Computing device 115 can control steering, propulsive torque and braking torque via controllers 112, 113, 114 to direct vehicle 202 to travel a determined best path to impact traffic object 204 at an estimated speed, direction and location and thereby minimize damage severity.

Computing device 115 can determine a best path of the paths available in the range of directions 206 and send signals to controllers 112, 113, 114 to direct vehicle to travel the best path. This can include applying maximum braking torque without breaking traction and skidding to slow vehicle 202 down the maximum amount prior to impact. Computing device can also direct vehicle to turn as it travels to cause a particular portion of vehicle 202 to impact traffic object 204. For example, particular portions of vehicle 202 front bumper can be reinforced to absorb impact and can be determined to be the particular portion of vehicle 202 that impacts traffic object 204 by traveling the best path.

Injury to occupant can be included in damage severity determination. Injury to occupants can be mitigated by occupant safety devices such as impact-deployable air bags and seat restraints. Determination of damage severity can include determination of the probability of effective deployment of occupant safety devices as function of the location, speed and force of the impact. For example, impact-deployable air bags can be more effective in preventing occupant injury in head-on impacts than in impacts to the side or at an angle to vehicle 202.

Determining a best path and piloting a vehicle 202 based on the best path as described above can reduce damage severity as a result of the impact in comparison to damage severity associated with an occupant piloting the vehicle 202. For example, in traffic scene 200, computing device 115 can determine that impact with traffic object 204 is inevitable given the direction of speed vector 210 associated with vehicle 202. An occupant, perceiving the same situation, can correctly determine that turning vehicle 202 to a path represented by speed vector 208 will miss the traffic object 204, but incorrectly estimate that vehicle 202 can achieve this path and attempt to turn vehicle 202 onto the path represented by speed vector 208. Attempting to turn vehicle 202 onto this path can cause vehicle 202 to impact traffic object 204 at portions of vehicle 202 that cause greater damage severity than a best path determined by computing device 115. In some cases vehicle 202 can lose traction and skid thereby impacting traffic object 204 at a portion of vehicle 202 that causes far greater damage severity than impacting object 204 on a best path, for example.

In other examples, some traffic objects 204 can be built to absorb impact, such as sand-filled plastic barrels commonly used to temporarily protect other, less yielding object such as concrete structures. In this case computing device 115 can use the information regarding the properties of traffic object 204 to select a path that results in impact with sand-filled plastic barrels rather than unyielding objects such as concrete abutments or steel rails.

Figure 3:
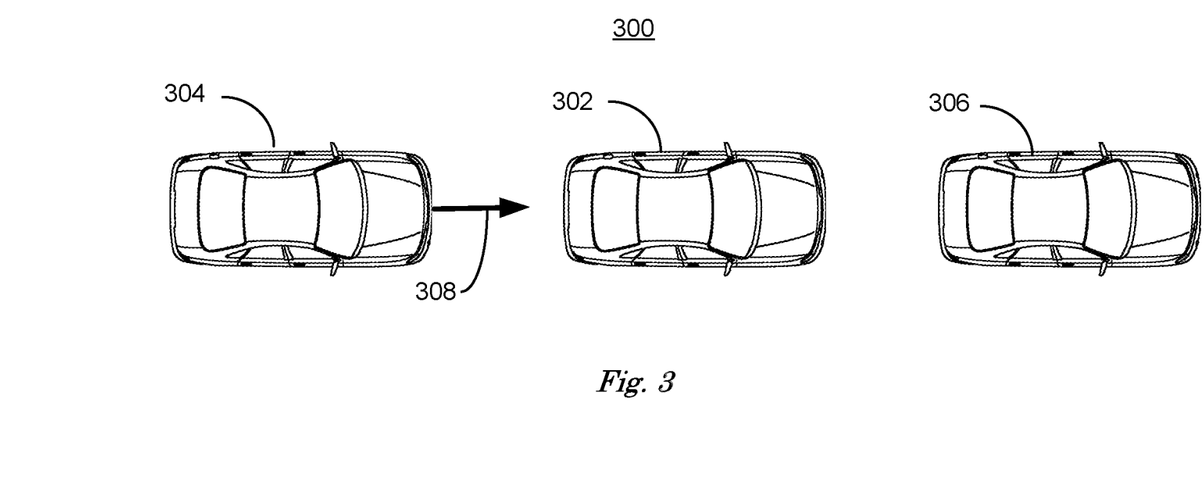
FIG. 3 is a diagram of three example vehicles.

FIG. 3 is a diagram of a traffic scene 300 including first, second and third vehicles 302, 304, 306. First vehicle 302 can include a vehicle control system 100 including a computing device 115 as described above. Second vehicle 304 is moving at a speed and direction shown by speed vector 308. Speed vector 308 has direction and length equal and proportional respectively to the direction and speed of second vehicle 304. At the time traffic scene 300 occurs, computing device 115 can determine that first vehicle 302 has stopped in traffic at a safe distance from third vehicle 306.

At the time traffic scene 300 occurs, computing device 115 included in first vehicle 302 can also determine, using sensors 116, for example, that second vehicle 304 is traveling at a speed and direction described by speed vector 308, and that the rate at which second vehicle 304 is slowing down is insufficient to prevent second vehicle 304 from impacting first vehicle 302. Based on information from sensors 116, computing device 115 can determine a first time of impact with second vehicle 304. Computing device 115 can also receive information regarding the speed and direction of second vehicle 304 from second vehicle 304 via a vehicle-to-vehicle network using BLUETOOTH® capability included in V-to-I interface 111 as discussed above in relation to FIG. 1, for example.

Computing device 115 can, as described in relation to FIG. 2, above, use predetermined information regarding structural properties of portions of vehicle 302 and determine estimated speed, direction and location of vehicle 304 with respect to vehicle 302 at the first time of impact. The speed and an estimated mass of vehicle 304 can be used to determine the amount of kinetic energy with which vehicle 304 will impact vehicle 302 and estimate the resulting damage severity.

Once computing device 115 has determined the first time of impact and estimated damage severity, computing device 115 can estimate damage severity based on commanding brake controller 113 to perform a full or partial reduction in braking torque before the impact. A full or partial reduction in braking torque at the time of impact can reduce the energy transferred from the impacting vehicle 304 to impacted vehicle 302 by permitting wheels to roll rather than skid and thereby reduce damage severity. Computing device can compare the estimated damage severity with and without full or partial reduction in braking torque to select the braking torque that yields the minimum damage severity. In some cases, computing device 115 can command brake controller 113 to reapply braking torque after the first impact to prevent a second impact between first vehicle 402 and third vehicle 306 following the first impact.

In cases where reapplying braking torque after the first impact fails to prevent a second impact between first vehicle 302 and third vehicle 306, computing device 115 can determine the timing and amount of braking torque to apply to minimize damage severity from both impacts. By applying or not applying braking torque, damage severity to the front and the back of the vehicle can change. Computing device 115 can determine the relative amounts of damage severity between the front and back of vehicle 302 by the timing and amount of braking torque applied after the first impact and select the braking torque that yields the minimum damage severity of both impacts.

Figure 4:
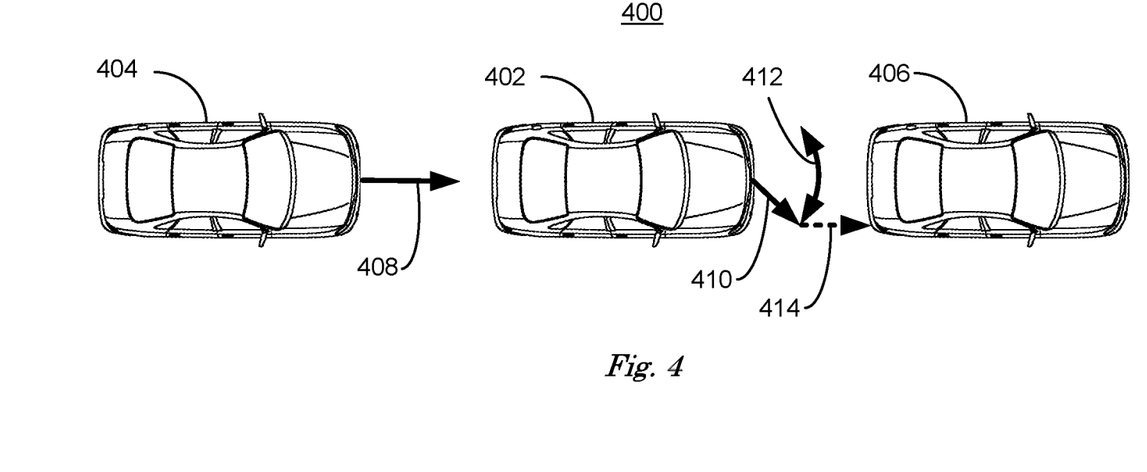
FIG. 4 is a diagram of three example vehicles.

FIG. 4 is a diagram of a traffic scene 400 including first, second and third vehicles 402, 404, 406. First vehicle 402 can include a vehicle control system 100 including a computing device 115 as described above in relation to FIG. 1. Second vehicle 404 is moving at a speed and direction shown by speed vector 408. Speed vector 408 has direction and length equal and proportional respectively to the direction and speed of second vehicle 404. At the time traffic scene 400 occurs first vehicle 402 has stopped in traffic at a safe distance behind third vehicle 406.

At the time traffic scene 400 occurs, computing device 115 included in first vehicle 402 can also determine, using sensors 116, for example, that second vehicle 404 is traveling at a speed and direction described by speed vector 408, and that the rate at which vehicle 404 is slowing is insufficient to prevent second vehicle 404 from a first impact with first vehicle 402. Based on information from sensors 116, computing device 115 can determine a first time of impact with second vehicle 404. Computing device 115 can also receive information regarding the speed and direction of second vehicle 404 from second vehicle 404 via a vehicle-to-vehicle network using BLUETOOTH® capability included in V-to-I interface 111 as discussed above in relation to FIG. 1.

Computing device 115 can, as described in relation to FIG. 2, above, use predetermined information regarding structural properties of portions of vehicle 402 and determine estimated speed, direction and location of vehicle 404 with respect to vehicle 302 at the first time of impact. The speed and an estimated mass of vehicle 304 can be used to determine the amount of kinetic energy with which vehicle 404 will impact vehicle 402 and estimate the resulting damage severity.

In addition to the impact between second vehicle 404 and first vehicle 402, computing device 115 can determine that first vehicle 402 will be propelled into a second impact with third vehicle 406 by the first impact with second vehicle 404, for example. Once computing device 115 has determined the first time of impact, computing device 115 can determine a range of steering directions 412 achievable by vehicle 402 based on being propelled by the first impact. The range of available steering directions includes a finite (<~10) selected subset of paths achievable for first vehicle 402 as discussed above in relation to FIG. 2.

Once a selected subset of paths included in the range of steering directions 412 is determined, computing device 115 can determine a best path of a selected subset of paths included within the steering directions 412 that minimizes damage severity based on the estimated kinetic energy of the first impact, the estimated kinetic energy transferred to vehicle 402 as a result of the first impact and is the estimated kinetic energy of the second impact, minus braking torque and reverse propulsive torque and the predetermined structural properties of the vehicle 402. The estimated kinetic energy of the second impact is proportional to the dotted speed vector 414. A best path minimizes damage severity associated with the first impact and the damage severity associated with the second impact.

A best path is represented by speed vector 410 associated with vehicle 402, for example. Computing device has determined that the first impact will cause a second impact between vehicle 402 and vehicle 406, so a best path represented by speed vector 410 minimizes the portions of vehicles 402 and 406 that contact during the second impact to minimize damage severity, for example. Once a best path is determined, computing device 115 can commanding brake controller 113 to reduce brake torque, for example, in preparation for the first impact with vehicle 404. Computing device can also command steering controller 114 to turn the vehicle's 402 wheels in a direction to cause vehicle to travel on the best path represented by speed vector 410, for example, propelled by the force of the first impact with vehicle 404. In other examples, computing device 115 can command powertrain controller 112 to increase propulsive torque to drive vehicle 402 wheels either forward or reverse to minimize damage severity.

Damage severity to first vehicle 402 is determined based on the predicted results of an impact between second vehicle 404 and first vehicle 402 and a second impact between first vehicle 402 and third vehicle 406. Damage severity can be determined as discussed above in relation to FIG. 2, where the kinetic energy, direction and location of the first and second impacts can be combined with predetermined information regarding the first vehicle's 402 structural properties and estimates of second and third vehicles' 404, 406 structural properties and mass.

Damage severity can be estimated for more than one path of the possible paths for first vehicle 402 and the estimated damage severity compared to determine the path with the minimum damage severity. Available paths for vehicle 402 are included in the achievable steering directions 412. As discussed above in relation to FIG. 2, achievable steering directions 412 include paths that are physically possible to be traveled by first vehicle 402 based on the steering capabilities of first vehicle 402. Paths for first vehicle 402 that are outside of achievable steering directions 412 are not included because first vehicle 402 is not capable of traveling these paths.

Given achievable steering directions 412, computing device 115 can select a finite subset of the possible paths substantially evenly distributed over the steering directions 412 and determine a damage severity estimate for each path in the subset of possible paths. The number of paths selected can be kept to a small number (<~10) in order to permit computing device 115 to determine damage severities in a short period of time. The number of paths selected and the complexity of the structural properties are kept small in order to permit computing device 115 to determine damage severity in time to direct the controllers 112, 113, 114 to pilot vehicle in preparation for the first impact.

FIG. 4 shows a speed vector 410 for first vehicle 402 that represents the best path selected by computing device 115 as having a minimal estimated damage severity. Prior to the determined first time of impact, computing device 115 can command steering controller 114 to turn the wheels in the direction of speed vector 410, command powertrain controller 112 to begin applying propulsive torque to the wheels and command brake controller 114 to reduce braking torque to position vehicle 402 on the determined path. The combination of movement and positioning of first vehicle 402 based on achievable steering directions 412 prior to the first time of impact can minimize estimated damage severity.

In FIG. 4, the dotted speed vector 414 shows the path that first vehicle 402 can be propelled along by the impact with second vehicle 404 after first vehicle 402 has traveled the best path represented by speed vector 410 to minimize damage severity. After second vehicle 404 has a first impact with first vehicle 402, first vehicle 402 can be propelled by the force of the first impact along a path represented by speed vector 414 to cause a second impact between first vehicle 402 and third vehicle 406.

Prior the time of the first impact between first vehicle 402 and another second vehicle 404, computing device 115 in the first vehicle 402 can command one or more controllers 112, 113, 114 to cause first vehicle 402 to travel a best path determined to result in minimum damage severity. For example, computing device 115 can determine that damage severity would be minimized if the second impact between first vehicle 402 and third vehicle 406 could be avoided. Computing device 115 can command brake controller 114 to maintain braking torque to prevent vehicle 402 from striking vehicle 406, for example, if computing device 115 has determined that the total damage severity to vehicle 402 is minimized in this fashion.

In another example, computing device 115 can determine that commanding steering controller 114 to turn the wheels to direct first vehicle 402 in the direction of the determined best path and commanding brake controller 113 to reduce braking torque while commanding powertrain controller 112 to remain in neutral with no propulsive torque applied to the wheels. For example, first vehicle 402 can be stopped prior to the first impact with second vehicle 404 and movement of first vehicle 402 following the first impact would be based on being propelled by the force of the first impact with second vehicle 404. Propelling first vehicle 402 along a best path by the force of the first impact can minimize damage severity.

In another example related to FIG. 4, first, second and third vehicles 402, 404, 406 can be moving at the time the traffic scene 400 occurs. In this case, computing device 115 can determine that first vehicle 404 is traveling at a speed and direction denoted by speed vector 408 and that no paths exist for first vehicle 402 that can prevent an impact between the first and second vehicles 402, 404 given the achievable steering directions 412 and therefore available paths for first vehicle 402. Computing device can determine a first time to impact between first and second vehicles 402, 404 and determine a best path of the available paths, represented by speed vector 410, that can minimize damage severity as discussed in relation to FIG. 2.

Minimizing damage severity can include damage caused by a second impact between first and third vehicles 402, 406. Following the first impact between first and second vehicles 402, 404, first vehicle 402 can be propelled by the force of the first impact into third vehicle 406 as shown by dotted speed vector 414. As in the first case discussed above, computing device can determine a best path of the available paths that minimizes damage severity from both the first and second impacts and command controllers 112, 113, 114 to control one or more of steering, brake torque and propulsive torque to cause vehicle 402 to travel the best path, shown by speed vector 410, before the first time of impact.

Figure 5:
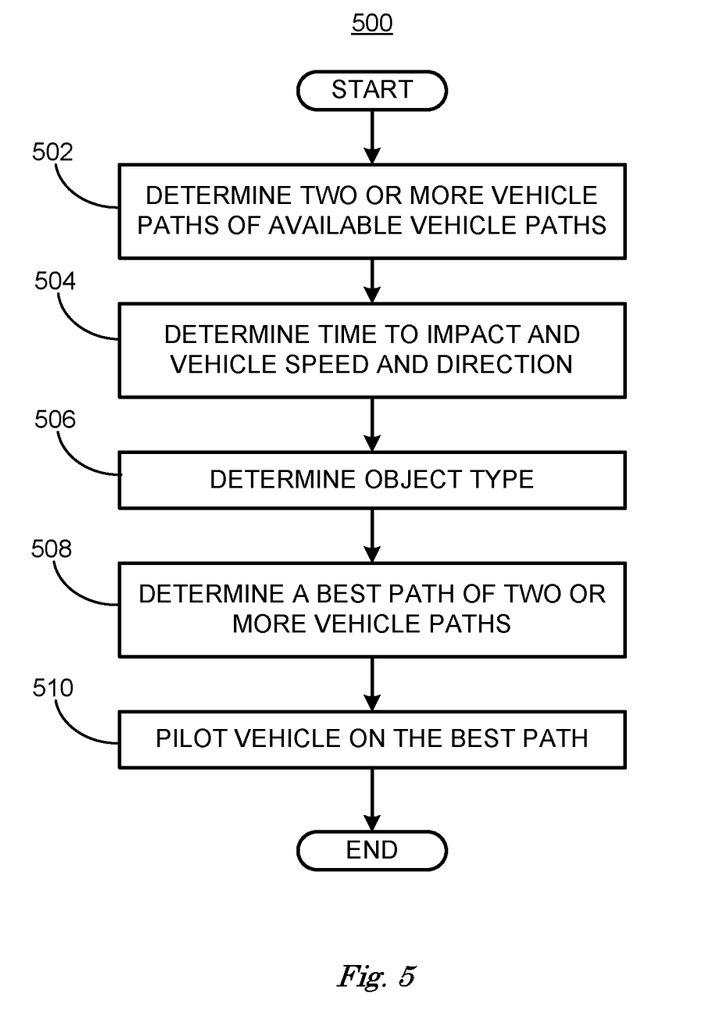
FIG. 5 is a flowchart diagram of an example process to pilot a vehicle based determining a best path.

FIG. 5 is a flowchart diagram, described in relation to FIGS. 1-4, of a process 500 for that determines a best path for piloting a vehicle that minimizes damage severity. Process 500 can be implemented by a processor of computing device 115, taking as input information from sensors 116, and executing instructions and sending control signals via controllers 112, 113, 114, for example. Process 500 includes multiple steps taken in the disclosed order. Process 500 also includes implementations including fewer steps or can include the steps taken in different orders.

Process 500 begins at step 502, where a vehicle 202, 302, 402 can determine two or more vehicle paths of available vehicle paths. As discussed above in relation to FIG. 2, a range of steering directions is available for a vehicle 202, 302, 402. Computing device 115 can select a representative subset of two or more of the achievable paths. Each path includes a predicted impact with an object including another vehicle.

At step 504 computing device 115 can determine a time to impact and speed and direction for the vehicle 202 and for an object as discussed above in relation to FIG. 2, wherein the object is a traffic object 204 and can have zero speed and direction, or wherein the object is another vehicle 304, 306, 405, 406 and can have measureable speed and direction. Another vehicle 304, 306, 404, 406 can be moving and therefore have a speed and direction measureable with respect to vehicle 302, 402, as discussed above in relation to FIGS. 3 and 4, or another vehicle 304, 306, 404, 406 can be parked and have zero speed and direction measureable with respect to vehicle 302, 402.

At step 506 computing device 115 can determine the object type. Object type can be a traffic object 204, such as a barrier, abutment, pier, railing or post located on or adjacent to a roadway. Object type can also be another vehicle 304, 306, 404, 406. As discussed above, object type can be used to estimate damage severity, since damage to vehicle 202, 302, 402 can depend upon the composition of the object impacted in addition to speed and direction.

At step 508 computing device 115 can determine a best path of the two or more vehicle paths determined in step 502 by estimating damage severity associated with each of the two or more vehicle paths based on estimate kinetic energy and the location and direction of the impact combined with predetermined information regarding structural properties of the vehicle 202, 302, 304 and the object type. Computing device 115 can select the vehicle path that minimizes damage severity t as discussed above in relation to FIG. 2.

At step 510 computing device 115 can pilot vehicle 202, 302, 402 on the best path to impact object with minimum estimated damage severity. Piloting vehicle 202, 302, 402 on the best path can include reducing or partially reducing braking torque, turning wheels to steer vehicle 202, 302, 402 or increasing or decreasing propulsive torque to move vehicle at a direction and speed to thereby minimize estimated damage severity due to an impact.

In summary, process 500 determines two or more vehicle paths in a range of achievable vehicle paths, estimates damage severity for the two or more paths and selects the path having minimum damage severity. Computing device 115 can then pilot vehicle 202, 302, 402 on the path having the minimum damage severity.

Computing devices such as those discussed herein generally each include instructions executable by one or more computing devices such as those identified above, and for carrying out blocks or steps of processes described above.

For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention

We claim:

1. A method, comprising:
    based on respective impacts resulting from each of two available paths for a vehicle, determining a best path of the two or more vehicle paths by determining damage severity of each impact based on time to impact, vehicle speed and direction and object speed and direction; and
    controlling one or more of steering, propulsive torque and braking torque to pilot the vehicle on the best path based on the damage severity.

2. The method of claim 1, wherein determining damage severity is based on determining kinetic energy for the vehicle at time of impact.

3. The method of claim 1, wherein all of the available paths include an impact.

4. The method of claim 1, wherein object speed and direction is stationary.

5. The method of claim 1, wherein object speed and direction is moving.

6. The method of claim 1, wherein controlling braking torque includes full or partial reduction of brake torque to permit vehicle to roll rather than skid.

7. The method of claim 1, wherein controlling propulsive torque includes:
    adding propulsive torque to position the vehicle on the best path based on time to impact and available paths to minimize damage severity.

8. The method of claim 1, wherein controlling steering includes:
    the vehicle on the best path including full or partial reduction of brake torque and adding propulsive torque to position vehicle on the best path based on time to impact and available paths to minimize damage severity.

9. The method of claim 1, wherein controlling steering includes:
    if the vehicle is stopped and the impact includes being struck by another vehicle, controlling steering to pilot the vehicle on the best path of the available paths determined by the impact.

10. An apparatus, comprising:
    a processor;
    a memory, the memory storing instructions executable by the processor to:
        based on respective impacts resulting from each of two available paths for a vehicle, determine a best path of the two or more vehicle paths by determining damage severity of each impact based on time to impact, vehicle speed and direction and object speed and direction; and
        control one or more of steering, propulsive torque and braking torque to pilot the vehicle on the best path based on the damage severity.

11. The apparatus of claim 10, wherein determining damage severity is based on determining kinetic energy for the vehicle at time of impact.

12. The apparatus of claim 10, wherein all of the available paths include an impact.

13. The apparatus of claim 10, wherein object speed and direction is stationary.

14. The apparatus of claim 10, wherein object speed and direction includes motion.

15. The apparatus of claim 10, wherein controlling braking torque includes full or partial reduction of brake torque to permit vehicle to roll rather than skid.

16. The apparatus of claim 10, wherein controlling propulsive torque includes:

adding propulsive torque to position the vehicle on the best path based on time to impact and available paths to minimize damage severity.

17. The apparatus of claim 10, wherein controlling steering includes:
the vehicle on the best path including full or partial reduction of brake torque and adding propulsive torque to position vehicle on the best path based on time to impact and available paths to minimize damage severity.

18. The apparatus of claim 10, wherein controlling steering includes:
if the vehicle is stopped and the impact includes being struck by another vehicle, controlling steering to pilot the vehicle on the best path of the available paths determined by the impact.

19. A vehicle, comprising:
a processor;
a memory, the memory storing instructions executable by the processor to:
based on respective impacts resulting from each of two available paths for a vehicle, determine a best path of the two or more vehicle paths by determining damage severity of each impact based on time to impact, vehicle speed and direction and object speed and direction; and
control one or more of steering, propulsive torque and braking torque to pilot the vehicle on the best path based on the damage severity.

20. The vehicle of claim 19, wherein determining damage severity is based on determining kinetic energy for the vehicle at time of impact.

* * * * *